United States Patent
van Hoff (10) Patent No.: US 6,381,631 B1
(45) Date of Patent: Apr. 30, 2002

(54) METHOD AND APPARATUS FOR CONTROLLING CLIENT COMPUTER SYSTEMS

(75) Inventor: Arthur A. van Hoff, Mountain View, CA (US)

(73) Assignee: Marimba, Inc., Mountain View, CA (US)

(*) Notice: Subject to any disclaimer, the term of this patent is extended or adjusted under 35 U.S.C. 154(b) by 0 days.

(21) Appl. No.: 09/324,891

(22) Filed: Jun. 3, 1999

(51) Int. Cl.[7] .............................................. G06F 15/16
(52) U.S. Cl. ........................ 709/202; 709/200; 709/201; 709/203; 709/217; 709/220; 709/225; 709/227; 709/229; 709/245; 707/1; 707/10; 707/205; 713/201
(58) Field of Search ................................ 709/202, 200, 709/201, 203, 227, 229, 217, 220, 245, 225; 707/1, 10, 205; 713/201

(56) References Cited

U.S. PATENT DOCUMENTS

| | | | | |
|---|---|---|---|---|
| 5,642,515 A | * | 6/1997 | Jones et al. .................. 710/220 |
| 5,671,414 A | * | 9/1997 | Nicolet ....................... 709/328 |
| 5,941,956 A | * | 8/1999 | Shirakihara et al. ......... 709/245 |
| 6,061,795 A | * | 5/2000 | Dircks et al. ................ 713/201 |
| 6,081,900 A | * | 6/2000 | Subramaniam et al. ..... 713/201 |
| 6,157,953 A | * | 12/2000 | Chang et al. ................ 709/225 |
| 6,167,567 A | * | 12/2000 | Chiles et al. .................. 717/11 |

OTHER PUBLICATIONS

IBMTDB, Feb. 1992, title : Extensible User Authentication in a Computer Operating Syatem, vol. 34, Issue No. 9, pp. 480–482.*

* cited by examiner

Primary Examiner—David Wiley
Assistant Examiner—Frantz B. Jean
(74) Attorney, Agent, or Firm—Innovation Partners; Charles E. Gotlieb (57) ABSTRACT

A method and apparatus connects a user to a remote network, and enforces operation of management software before the user is allowed to perform other tasks on the remote network. The method and apparatus also allows connection of the user to a third party network. The user may be restricted from accessing third party networks not on a trusted list of networks, which may be updated by the management software. The method and apparatus enforces access rules for the third party software to prevent unauthorized retrieval or deletion of information by the third party software.

17 Claims, 4 Drawing Sheets

METHOD AND APPARATUS FOR CONTROLLING CLIENT COMPUTER SYSTEMS

RELATED APPLICATIONS

This application is related to application Ser. No. 09/231,322, now U.S. Pat. No. 6,272,536 entitled "System and Method for the Distribution of Code and Data" filed by Arthur van Hoff, Jonathan Payne and Sami Shaio on Jan. 13, 1999, which is a continuation of application Ser. No. 08/690,257, now U.S. Pat. No. 5,919,247 entitled "System and Method for the Distribution of Code and Data" filed by Arthur van Hoff, Jonathan Payne and Sami Shaio on Jul. 24, 1996, and to application Ser. No. 09/247,199 entitled, "METHOD AND APPARATUS FOR ACCEPTING AND REJECTING FILES ACCORDING TO A MANIFEST" filed by Sami Shaio on Feb. 9, 1999, each commonly owned and having the same assignee as the present application and each is incorporated by reference herein in its entirety.

FIELD OF THE INVENTION

The present invention is related to management software and more specifically to management software for remote clients.

BACKGROUND OF THE INVENTION

Management software allows an administrator to control, maintain and update files stored on client computer systems in a conventional client-server system. Conventional management software resides on both a server computer system, called a server, and on a client computer system, called a client. Management software in the server can determine which files should be installed on a client. When the client and server are in communication with one another, the server management software can provide any necessary files to the client management software, and direct the client management software to install the files received or use the files received to update files already stored on the client computer system. Additionally, the server management software can direct the client management software to delete any files that should no longer reside on the client.

One way of determining which files should be installed on the client computer system is to have the client management software provide the server management software with some form of identification of the user of the client computer system. For example, the client management software can supply to the server management software a name or a type of a user of the client computer system. The server management software uses the name or type of the user to determine which files that user or type of user should have and then sends the appropriate files or instructions or both to the client management software.

For example, all supervisors of a company may receive updated salary information every Monday morning. The client management software in a particular client computer system used by a supervisor can be preprogrammed with the supervisor's name or title and the client management software can provide this information to the server management software. The server management software can provide updated salary information to the client management software based on the information it receives from the client management software. In contrast, client management software on a different computer identifying the user as an employee would not receive this updated salary information because the server management software will only send this information to supervisors.

If the client computer system is connected to the server computer system through a conventional LAN connection, management software can perform its operation relatively transparently to the user. For example, a client computer system can be updated by the management software in the background while the user is performing other work. Alternatively, the management software can update the client computer at a time when the user of the computer is not expected to be using the computer, such as after normal business hours. This may be implemented via wake-up timers, wake-on-LAN interfaces and the like so that the user need not perform any action to receive updated files.

Further adding to the transparency of operation of management software for LAN connected client computer systems is the fact that the identity of the user can be automatically supplied by the client computer system. The user does not have to authenticate himself to the management software each time it runs. Although the lack of authentication could allow security breaches to occur, the physical security of the building may be considered sufficient security to make this a suitable option.

If the user uses a computer that does not have a LAN or other similar persistent connection to the server, updating files using management software can be more difficult. For example, if a user occasionally connects (e.g. via a dial-in connection, such as through a Virtual Private Network, or VPN) to the remote network that contains the server, the files must be updated by the management software in the client and server while the user is connected to the remote network. Because updating the user's files can be a time- and bandwidth-consuming process, and because the user may only connect to the remote network when the user wants to perform other work, the user may not want to allow the management software to update his files when he logs onto the network.

For example, if the user is in a hurry, he may refuse to run, or abort the operation of, the management software when he connects to the remote network. This makes it difficult for a system administrator to control the files on a user's computer system when the user does not have a LAN or other persistent connection to the network. If the user does not allow the management software to operate, the user may not have files he needs or may be working with out of date files.

There is an additional inconvenience when using management software from a computer without a LAN or other persistent connection into the network containing the server. Because such a computer lacks the security associated with the LAN or other persistent connection, the user must authenticate himself to the management software to prevent unauthorized users from dialing into the company's network and then receiving sensitive files. Authenticating a user to management software can seem especially inconvenient. This is because users who dial into the company's network often must first authenticate themselves to the software that will connect them to the remote network, and then reauthenticate themselves to the management software in what seems like a redundant operation.

There is another problem with dial-in users. Because dial in users dial into the company's network, they may be capable of dialing into other networks, such as those operated by third parties. In some cases, communication with third parties is authorized and safe, but in other cases it can be dangerous.

Authorized communication with third party networks can allow the use of third parties to supply information or services to their users. The remote user must connect to the third party network to receive such information or services. However, allowing the user to connect to any third party can be dangerous. If a user were to connect to a network of an untrusted third party, that third party could obtain access to the storage system of the user's client computer. Such access might allow the third party to download viruses or other files, upload files that are confidential to the company, or overwrite files, either on purpose or by accident, that should not be overwritten.

To control the networks to which a dial-in or other remote user can access, a "pass through" arrangement may be employed. This pass through arrangement uses an existing connection that is maintained between the third party network and the corporate network to allow users of the corporate network to access the third party. To prevent dial-in users from accessing unauthorized third party networks while allowing access to authorized third party networks, software in the dial-in user's client computer system is configured to allow dial-in users to dial into the corporate network, but not other networks. These users use the connection between the corporate network and any third party network to communicate with any third party networks.

This "pass through" arrangement allows a system administrator of the company to limit the third party networks to which such dial-in users connect. Users may only connect to third parties that are trusted by the system administrator and therefore have some form of connection with the company network.

Although the arrangement allows the system administrator to remain in control of the third parties to which the user is allowed to connect, it generates traffic and uses resources on the company's network solely for the purpose of maintaining control over the remote user.

What is needed are a method and apparatus that can enforce the operation of management software when a user logs into a remote network, does not require the user to reauthenticate himself to the management software, and can allow system administration control over a user or software using a third party network without requiring the user to pass through a company network.

SUMMARY OF INVENTION

A method and apparatus enforces operation of management software after a user logs into a remote network and before the user is allowed to perform other functions on the remote network. Information received from the user to authenticate the user to the remote network may also be used to authenticate the user to the management software, eliminating the need for the user to reauthenticate himself to the management software after authenticating himself to the remote network. A list of trusted third party networks is maintained by the client computer system, and the method and apparatus only allows the user to connect to third party networks on the trusted list, eliminating the need for remote users to pass through the corporate network. The trusted list may be received by the client management software. Access to the user's system may be controlled to restrict the action of third parties communicating with the user's system.

DETAILED DESCRIPTION OF A PREFERRED EMBODIMENT

Figure 1:
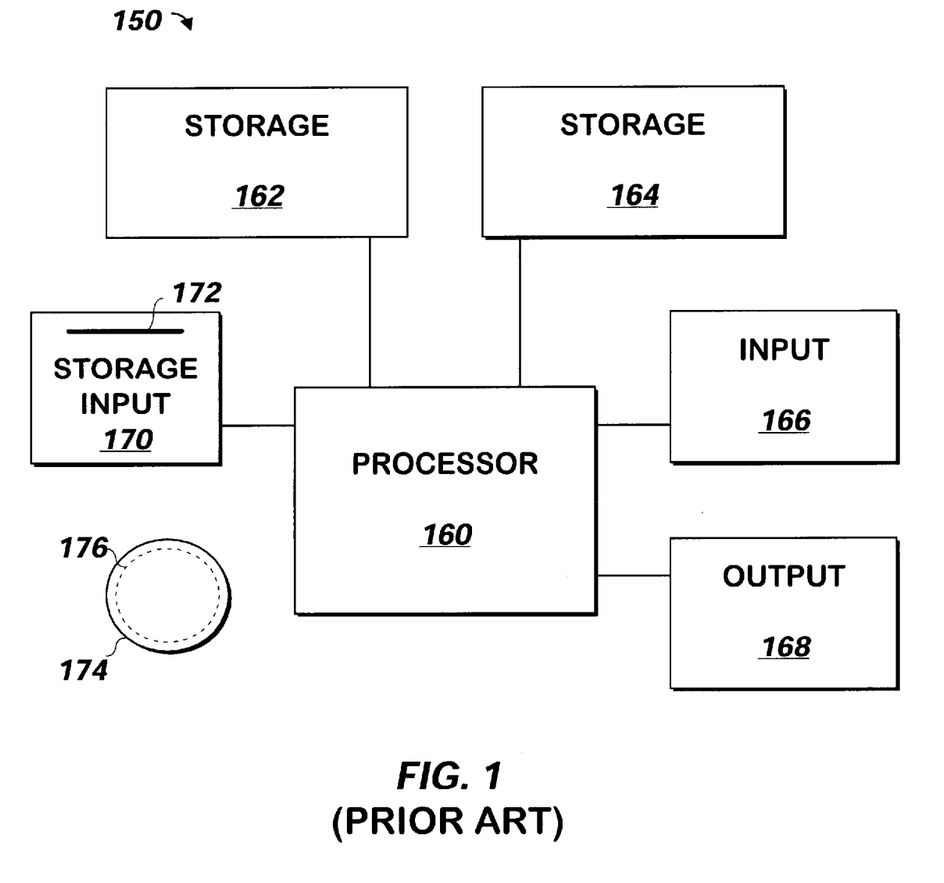
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM-compatible XPS 333 Pentium II computer commercially available from Dell Computer Corporation of Round Rock, Tex. running the Windows 98 operating system commercially available from Microsoft Corporation of Redmond, Wash., although other systems may be used.

I. Enforced Operation of Management Software Referring now to FIG. 2, a system 200 for connecting to remote and third party networks and for managing a client computer system is shown according to one embodiment of the present invention. As used herein, a remote network is under the control of a business organization employing the user of the system 200, and a third party network is under control of a different party. Both types of networks include some type of server. In one embodiment, the system 200 resides on a user's client computer for communication with a remote network or third party network as described below. In another embodiment, some or all of the system 200 resides in computer systems other than the user's computer system.

Figure 2:
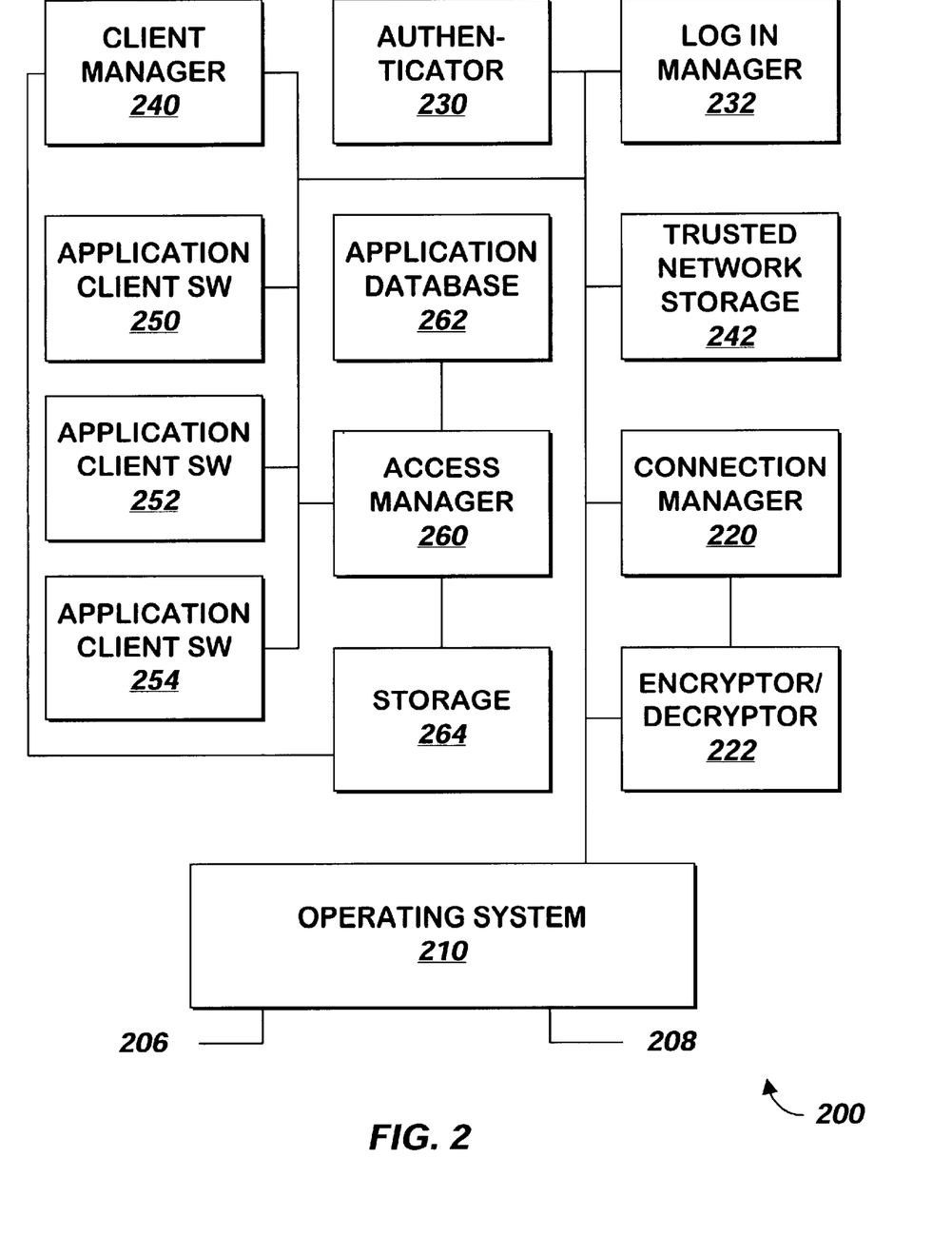
FIG. 2 is a block schematic diagram of a system for connecting to remote and third party networks and for managing a client computer system according to one embodiment of the present invention.

The user communicates with the system 200 via operating system 210 such as Windows 98, via input/output 206, which may be coupled to conventional input/output devices such as a conventional keyboard/monitor/mouse, and may also include optical or audio input or input/output devices for recording a fingerprint, iris scan, retina scan, voiceprint, hand geometry, finger geometry, signature, face pattern data or other biometric data.

When the user wishes to connect to a remote network, the user uses operating system 210 to initiate operation of connection manager 220. Connection manager 220 signals log in manager 232, which prompts the user to identify himself or herself to the system 200. The user may identify himself or herself using a conventional username and password, a username alone, or may merely provide a form of physical or other biometric identification, such as a fingerprint recognition, voice recognition, iris scan, retina scan, hand or finger geometry recognition, face recognition or other physical or biometric identification using the optical scanner or microphone or keyboard and mouse coupled to input 206. The devices and software associated with such identification of a user are described in "Biometric Basics", PC Magazine, Volume 18, No. 7, Apr. 6, 1999 page 193–202, and that article is hereby incorporated by reference.

Log in manager 232 receives this identification information via operating system 210 and either sends the information to the remote network via connection manager 220 for authentication or authenticates the information locally using authenticator 230. To send the identification information to the remote network, log in manager 232 signals connection manager 220.

Connection manager 220 requests a modem session via operating system 210 and a modem or other communication device coupled to input/output 208. In one embodiment, connection manager 220 retrieves from a remote network file in trusted network storage 242 the proper sequence of commands to allow the user to log into any of several remote networks as described in more detail below. The user selects one of these networks and connection manager 220 sends the corresponding sequence of commands via operating system 210 and the modem coupled to input/output 208. The sequence of commands may include the telephone number for the modem to dial.

In one embodiment, the file describing the remote networks is the network that has the server management software. There may be multiple such remote networks and all of these networks are described in the remote network file.

Connection manager 220 may direct the modem to dial a virtual private network access point, such as an Internet service provider in one embodiment, and supply the name, routing information or other identifier of the remote network. Connection manager 220 may retrieve this information from a remote network file stored in trusted list storage 242 as described below. Other forms of contacting the remote network unrelated to virtual private networks may also be used.

If authentication of the user is performed by the remote network, log in manager 232 sends the authentication information to the remote network as described above and detects the reply from the remote network. In one embodiment, the remote network is capable of sending a response to log in manager 232 indicating that the user has been authenticated.

If the user is authenticated, log in manager 232 stores an indicator of this fact so that the user can log into other networks without reauthenticating himself or herself to log in manager 232. The indicator may be a digital certificate provided by the remote network. In one embodiment, log in manager 232 stores a digital representation of the identification information it received from the user of the user instead of, or in addition to, the indicator. In either event, when connection manager 220 signals log in manager 232, log in manager 232 will not prompt the user, and will send authentication information sufficient to allow the user to log into the other network.

If the authentication is performed locally by the system 200, log in manager 232 sends the identification information received from the user to authenticator 230. Authenticator 230 compares the identification information to the identification information in a local database and if the identification information matches the information in the database, authenticator 230 signals log in manager 232. Log in manager 232 stores an indicator of authentication or the identification information as described above, and can direct connection manager 220 to connect to the requested remote network as described below.

In one embodiment, two procedures are followed to connect to the network in one embodiment. First, messages are sent through the modem to establish the connection with the remote network or to a gateway or firewall of the remote network. Second, the client and remote network/gateway/firewall exchange authentication information.

Connection manager 220 retrieves from trusted network storage 242 the instructions or messages required to establish a connection with the remote network selected by the user. Connection manager 220 sends this information to output 208 for sending to the modem or other communications device coupled thereto as described above.

Once the connection is established, connection manager 220 signals log in manager 232. Log in manager 232 signals authenticator 230, which provides to the remote network a digital certificate corresponding to the user's identification information and receives a digital certificate of the remote network using conventional digital certificate exchange techniques. In one embodiment, the digital certificates exchanged are conventional X.509 digital certificates, but other types of certificates or other similar information may also be exchanged in order to allow the system 200 and remote network to authenticate the other.

Authenticator 230 determines if the sender is the remote network by comparing the identity of the sender on the sender's certificate with a trusted list of senders stored in trusted network storage 242. Authenticator 230 may also use other authentication processes, such as conventional digital signature comparison techniques. Authenticator 230 may send via the same path to the remote network an acknowledgement if the authentication process described above is successful, and may receive an acknowledgement from the remote network via the same path. If the authentication process successfully completes, authenticator 230 signals log in manager 232.

In one embodiment, some or all communication in or out of the system 200 is performed in an encrypted fashion. Information to be sent out of the system is sent by connection manager 220 to operating system 210 via encryptor/decryptor 222. Encryptor/decryptor 222 encrypts the information using conventional encryption techniques, then sends it to operating system 210 for transmission. Information received may be decrypted using encryptor/decryptor 222. When operating system 210 receives messages via input/output 208, it sends them to encryptor/decryptor 222, which decrypts the information and then passes it to connection manager 220.

In one embodiment, encryptor/decryptor 222 uses the conventional IPSEC protocol for encryption. IPSec is presently described at http://search.ietf.org/internet-drafts/draft-ietf-ipsec-arch-sec-05.txt. It is noted that the above specifications may be updated or modified from time to time. The site http://www.ietf.org should be consulted for the latest information.

In one embodiment, all communications from connection manager 220 are encrypted. In another embodiment, communications are encrypted after the certificate exchange described above is complete. In such embodiment, authenticator 230 signals encryptor/decryptor 222 after it has authenticated the remote network as described above.

Some of the above procedures may be performed by conventional virtual private network software although the present invention is not limited to such networks or such software. Virtual private networks are described in Murhammer, *A Guide to Virtual Private Networks* (1998 Prentice Hall PTR ISBN 0-13-083964-7). However, conventional virtual private network software would next allow the user to communicate with the remote network. The present invention does not allow such communication at this time in one embodiment. Instead, log in manager 232 signals client manager 240, which is conventional client management software as described below. Connection manager 220 does not allow the user to communicate with the remote network via the input/output 206 until signaled by management software 240.

When the connection is established, log in manager 232 passes the certificate that was sent to the remote network, similar information, or information corresponding to the certificate or similar information to client manager 240. This may include the name of the user and a public key of the user. Client manager 240 sends some or all of this information to the server management software of the remote system for authentication. Client manager 240 may receive a certificate or other authentication information from the server management software, which may be used to authenticate the server management software as described above.

In one embodiment, client manager 240 is conventional management client software such as the Castanet tuner product commercially available from Marimba, Inc., of Mountain View, Calif. Client manager 240 communicates with server management software (not shown) on a server on the remote network to install, remove or update any necessary files and to install, remove or update any applications as described in the copending applications. In one embodiment, server management software is the conventional Castanet transmitter product available from Marimba, Inc., of Mountain View, Calif.

Client manager 240 requests files or update instructions (including instructions to delete) for files and stores the files received or implements the instructions on files already stored on storage 264, which may be any conventional disk or memory storage.

When client manager 240 has completed the process of receiving any necessary files or instructions and performing any updating activities required as a result of the files or instructions received, management software 240 signals connection manager 220. Connection manager 220 only then allows the user to communicate with the remote system to perform tasks other than logging in or those performed by the client or server management software.

The user may communicate with the remote system via input/output 206, operating system 210, encryptor 222 and connection manager 220, which routes the encrypted communication via operating system 210 and input/output 208 coupled to the modem. Information is received from the remote network backwards through the same path.

In one embodiment, the user is allowed to override the restriction that he not be allowed to communicate with the remote network to perform other work until the management software has completed its operation. In such embodiment, the user may elect to stop the operation of the management software and communicate with the remote network in an implied pact with connection manager 220. The user is allowed to communicate with the remote network before the client manager 240 runs the management software at a later time but before the user logs off of the remote system. This would allow a user who is logging on to perform an urgent task to override the operation of the system, but only once or another configurable number. If the user exceeds the configurable number (or a configurable number of days), the next time the user logs in, he is not allowed to override the enforced operation of the client manager 240. Connection manager 220 increments a counter to identify that the user has been given this chance. In such embodiment, the user is periodically reminded by connection manager 220 that he will need to run the management software before he logs off from the remote network, and a button is displayed that the user can click to run it. A file received by management software is stored in storage 264 that describes the number of chances the user is allowed to have. If the user logs off without running the management software 240, and the user counter is equal to the configurable number of chances, the next time the user logs onto the system, he will not be given the opportunity to skip operation of the management software 240. Instead, the system 200 operates as described above and the user must wait for any updates to be received before he or she is allowed to communicate with the remote system.

II. Restriction on Connections to Other Networks

In one embodiment, the user may connect to other networks by signaling connection manager 220. Connection manager 220 signals log in manager 232 which can then send to input/output 208 the proper command sequence to connect to the other network and send the other network the information required to log into the other network as the same user that logged into the remote network. Log in manager 232 will not require the user to reauthenticate himself in one embodiment if the user has recently done so as described above. This command sequence provided by log in manager 232 is retrieved from trusted network storage 242, having been stored as described below. Thus, the user need not reauthenticate himself to log into a different remote network as long as log in manager 232 continues to run on the user's system in one embodiment.

In one embodiment, the user is allowed to communicate only with specified networks. This restriction is enforced using a list of trusted networks in an "other network" file maintained by the system 200. In one embodiment, the list of trusted networks in the other network file is provided and/or maintained by the remote network using the client manager 240 in communication with the server management software as described in more detail below.

In one embodiment, while server management software and client manager 240 are communicating as described above, server management software can send information about other networks with which the client is allowed to communicate to client manager 240. Such other networks may be third party networks or other remote networks. This allows a system administrator to determine the remote networks a user is allowed access in addition to determining third party networks the user is allowed to access. Client manager 240 stores this information in an "other network file" in trusted network storage 242, which may be memory or disk. The information may be a list of names and contact instructions (e.g. dialing sequences and commands sequences used to log in) used to contact the other network. In one embodiment, connection manager 220 allows the user to contact only those networks identified in trusted network storage 242, including the remote network as described below. This way, connection manager 220 enforces the requirement that any other network contacted by the user is listed as trusted.

The remote network file described above may also be updated in trusted network storage 242 by the remote system using management software 240. This allows an administrator of the remote system to make any changes to dial in sequences or otherwise when users log into the remote network. The remote network file and the third party network file may be the same file or multiple files.

In one embodiment, the information about trusted networks received from the server management software includes one or more certificates that may be provided to some or all of the other networks in order to log into those other networks. In such embodiment, these certificates are stored in trusted list storage 242 and sent by log in manager 232 to the other networks that require them. The certificates indicate to the other network that an administrator at the remote network has granted permission for the user to use the other network. Some or all of the procedures used to log into the remote network as described above may be used to log into the other networks.

In one embodiment, the other network file stored in trusted network storage 242 includes an expiration date and time. Connection manager 220 will not allow the user to contact any network other than the remote network or network described in the remote network file after the expiration date and time. If the user has not logged into the remote network for a while, the list of trusted networks will expire and the user would have to log into the remote network as described above in order to update the list of trusted networks as described above before connection manager 220 will access the other networks. In such embodiment, connection manager 220 will either not display the other networks for the user to select, or will select them but instruct the user that he or she must first connect to the remote network as described above. Connection manager 220 will then allow the user to connect to the remote network to update files including the file or files describing trusted networks.

III. Restriction of Access for Third Party Networks

In one embodiment, a user may wish to connect to a third party's network to fully operate certain applications. The third party is a business entity different from the entity for which the user works. The third party's network may manage files for use by client software on the user's computer or may contain a server application, which operates in conjunction with the client software.

In one embodiment, the connection to the third party may be established transparently to the user once the user has authenticated himself to the remote network as described above. The user uses operating system 210 to run the application client software 250, 252, or 254 corresponding to the application desired by the user. Application client software 250, 252 or 254 signals connection manager 220 to establish a connection with the proper third party network. In one embodiment, this network is identified by the application client software 250, 252 or 254. A virtual private network or other form of connection to the third party network may be used to connect to the third party network.

If a virtual private network is used, connection manager 220 signals the modem connected to input/output 208 to establish a connection with the virtual private network. Connection manager then passes the name of, or other information corresponding to, the third party network it receives from application client software 250, 252 or 254 to the virtual private network, which establishes the connection. Alternatively, connection manager 220 may signal the modem coupled to input/output 208 to dial into the third party network directly, without the use of a VPN. The same log in procedure described above may be used, or a different procedure may be used.

In one embodiment, before connection manager 220 attempts to establish a connection with the third party network, connection manager 220 signals log in manager 232. If the user has authenticated himself to log in manager 232 as described above, log in manager 232 provides the authentication information stored in trusted network storage 242 that will allow the user to log in to the third party network. This may include a digital certificate, username and password or other information, received from management software 240 and stored in trusted network storage 242, or the user via input 206 and via connection manager 220, or both.

In one embodiment, when log in manager 232 logs into the remote network as described above, log in manager 232 receives from the remote network a digital certificate as described above. The digital certificate may include any information the user is supposed to use to authenticate himself to the third party network and an expiration date for the certificate. The third party can use the digital certificate to ensure that the user has been authenticated to the remote network and is authorized to use the third party network until the expiration date of the certificate.

In one embodiment, the system 200 restricts access to the storage facilities 264 of the system 200. The storage facilities 264 may be limited to the hard disk of the user's system, or may encompass more of the facilities, such as the memory of the user's system. When the application client software 250, 252 or 254 attempts to access the storage facilities 264, it must do so using access manager 260. Access manager 260 may enforce access via a Java sandbox or other similar technique, such as is described in U.S. Pat. No. 5,642,417 "Virtualized Installation of Material", and that patent is hereby incorporated by reference in its entirety. Access manager 260 looks up in application database 262 whether the application has the permission to perform the sort of access desired, read or write, of the storage facilities 264. The application database describes for each application client software 250, 252 or 254, the disks, directories, subdirectories or files the application client software 250, 252 or 254 can access and the type of access, read, write, or read and write, allowed. For example, an e-mail application client software may be limited to accessing the e-mail directory of the user. If the access requested is inconsistent with the allowed access for that application client software, 250, 252 or 254, access manager refuses to allow the access requested. This prevents the application client software 250, 252 or 254 from accessing portions of the storage facilities 264 for which the application client software 250, 252 or 254 is not authorized.

In one embodiment, the application database 262 is received from management software 240 whenever it requires updating, and stored encrypted on the user's hard disk. This allows the application database to be changed as often as necessary, and as often as the application client software 250, 252 or 254 is updated.

Figure 3A:
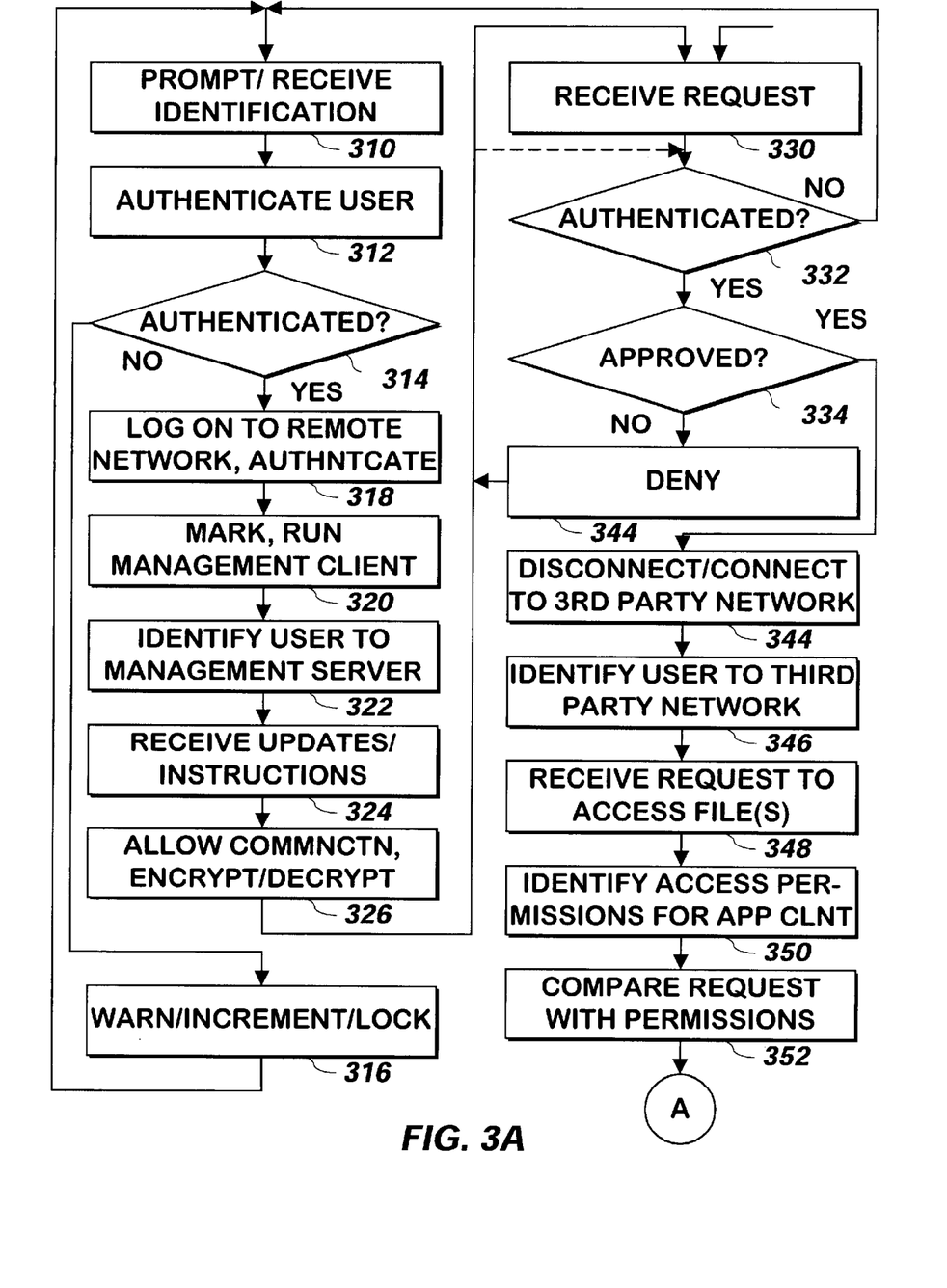
FIGS. 3A and 3B are a flowchart illustrating a method of connecting to remote and third party networks and for managing a client computer system according to one embodiment of the present invention.
Figure 3B:
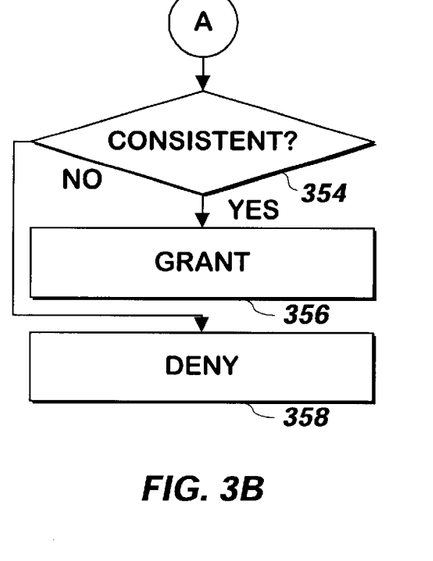

Referring now to FIGS. 3A and 3B, a method of connecting to remote and third party networks and for managing a client computer system is shown according to one embodiment of the present invention.

The user is prompted 310 for identification information and the identification information is received 310 as described above. The identification information may be locally authenticated 312 as described above. If the identification is locally authenticated, and the authentication fails 314, the user may be warned 316 that he will have to identify himself again and an optional counter may be incremented 316, having been initialized to zero in a step not shown that precedes step 310, and the method continues at step 310. If the counter reaches a threshold value, the system may be locked 316 as described above.

If the user is authenticated locally, or otherwise if no local authentication is performed, a remote network is connected 318, for example by dialing into a VPN access number or Internet service provider or other party and transmitting an identifier of the remote network that is retrieved from a database or file as described above. Identifiers corresponding to the user's identification information received in step 310 are provided to the remote network as part of step 318. The identifiers may be one or more digital certificates as described above, and step 318 may include receiving and verifying one or more digital certificates as described above. Additional information may also be provided and received as part of step 318. The authentication process described above may also be performed as part of step 318.

The user may be marked as having been authenticated 320 as described above. Marking the user as having been authenticated can allow subsequent identifications to be made without requiring the user to reauthenticate himself. In one embodiment, the authentication is performed by the remote network as part of step 318 and the remote network provides a certificate that can be used to authenticate the user to other networks as described above.

Management client software is run 320 as described above and the user is identified 322 to the management software using stored identifiers corresponding to the identifiers received from the user or identifiers corresponding to identifiers provided to the remote network in step 312. In one embodiment, the user is prohibited from preventing the operation of the management client software or communicating with the remote system other than to run the management software before or during step 320. In one embodiment, no other activity may be performed by the user over the remote network while the management software is being run as part of step 320. In another embodiment, other activities may be performed concurrently with the operation of the management software or before the operation of the management software as described above. For example, the user may be allowed to run application such as e-mail while or before the management software operates.

Updates or instructions (such as delete a certain file or files) are received 324 from the server management software as described above, and then the user is allowed 326 to communicate with the remote network to perform functions other than the management functions of step 324. In one embodiment, the user may not communicate with the remote network other than to perform management functions until the management functions are completed. In addition, a list or update to a list of trusted other networks may be received in step 324 as described above. A file or update to a file containing information for contacting the remote network may also be received. The list and file may be stored as part of step 324.

In one embodiment, the communications with the remote network may be encrypted and decrypted 326 as described above. In one embodiment, other steps besides step 326 may be encrypted. For example, encryption such as IPSec may be used for steps 318–326 or other steps. Communications with third party networks described below may also be encrypted in one embodiment.

Figure 3C:
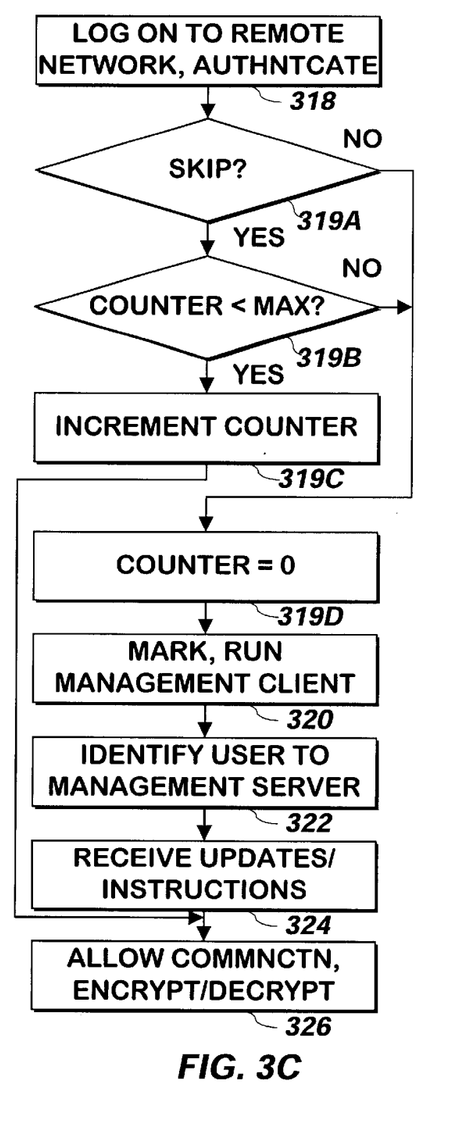
FIG. 3C is a flowchart illustrating additional steps that, when inserted into FIGS. 3A and 3B, form an alternate embodiment of the present invention.

In one embodiment, the user may be allowed to skip steps 320–324 a limited number of times or for a limited period. Referring momentarily to FIG. 3C, steps 318–326 are shown with additional steps 319A–D. Following step 318, if the user elects to skip 319A operation of the management software and a counter is less 319B than the maximum value specified in a file or other location, the counter is incremented 319C and the method continues at step 326, otherwise the counter is reset to zero and the method continues at step 320. The steps other than 319A–D operate as described with reference to FIGS. 3A and 3B.

Referring again to FIGS. 3A and 3B, if the user wishes to run application client software, a request to connect to another network such as a third party network or another remote network may be received 330 from the application client software or from the user. It is possible that this request is received without having performed steps 310–326. This possibility is represented by the second arrow above step 330. In such case, it is possible that the user may not have been authenticated or the user's authentication may have expired as described above. The user's authentication status is tested as part of step 330 after the request is received.

If the client has not been authenticated 332, steps 310–326 are optionally first performed and the method continues at step 332 as shown by the dashed line. Alternatively, the client may be locally authenticated. Otherwise, if the user has been authenticated, the method continues at step 334.

If the other network to which the user is requesting to connect is in a set of approved networks 334, the method continues at step 344, otherwise, the user is denied 344 access to the other network. In one embodiment, the set of approved networks is described in one or more files and some or all of these files may be received in step 324 as described above.

If the user is connected to the remote network, the user is disconnected 344 from the remote network or other remote network if necessary and connected 344 to a third party network. The third party network may be specified in the request received in step 330. In one embodiment, the specification includes the dial and log in sequence and in another embodiment, the dial and log in sequence is looked up in a table or file as described above. The user may be identified 346 to the third party network using the identification received in step 310 or using a different identification that corresponds to the identification received in step 310 as described above.

A request to access (either read or write) a storage area may be received 348 from an application client as described above. Access permissions for the client as described above may be identified 350, and the request compared 352 with the access permissions. If the request is consistent 354 with the access permissions, the request is granted 356, otherwise it is denied 358 as described above.

What is claimed is:

1. A system for managing files in a client computer, the system comprising:

a log in manager having an input, an output and an input/output operatively coupled for communication with a first network, the log in manager for receiving identification information of a user at the log in manager input and providing to the first network at the log in manager input/output authentication information responsive to the identification information received at the log in manager input, and. for providing a signal at the log in manager output after at least some of the information is provided at the log in manager input/output;

client manager having an input coupled to the log in manager output, an input/output operatively coupled for communication with the first network, a first output and a second output, the client manager for:
  receiving the signal at the client management input;
    requesting at least one selected from a first file and update instructions to a second file responsive to the signal received at the client manager input;
    providing at least one selected from the first file and the update to the second file at the client manager first output; and
    providing a completion signal at the client manager second output responsive to receipt of at least one selected from the first file and the update; and a connection manager for receiving at a first input/output a request for a communication session with the first network, for receiving the completion signal at an input coupled to the client manager second output and for enabling communication between the first input/output and a second input/output operatively coupled for communication with the first network responsive to the completion signal received at the connection manager input.

2. The system of claim 1, wherein:
the client manager is additionally for providing at the client manager input/output a first identifier of the user responsive to a second identifier of the user received at an identifier input; and
the log in manager is additionally for providing the second identifier of the user at an identifier output responsive to the identification information received at the log in manager input.

3. The system of claim 1 additionally comprising:
a storage system for storing at least a portion of at least one file;
at least one client application having an input/output operatively coupled for communication with a second network and for accessing the at least a portion of the at least one file;
an application database containing a description of access privileges for the at least one client application with respect to the storage system; and
an access manager coupled to the at least one client application, the storage system and the application database for controlling access to the at least the portion of the at least one file by the at least one client application responsive to the application database.

4. The system of claim 1 additionally comprising:
a trusted network storage having an input operatively coupled to receive at least one identifier of at least one network and an output for providing at least one of the at least one identifier of the at least one network; and
wherein at least one selected from the log in manager and the connection manager additionally has a trusted network input coupled to the trusted network storage output for receiving at least one of the at least one identifier of the at least one network and is for establishing a connection with the first network responsive to the at least one identifier received at the trusted network input.

5. The system of claim 4 wherein the client manager is additionally for receiving the at least one identifier of the at least one network and providing said identifier at a trusted network output coupled to the trusted network storage input.

6. A method of connecting to a remote network, comprising:
receiving a request to connect to a remote network;
establishing a connection to the remote network;
restricting user communication with the remote network responsive to the receiving the request step;
receiving at least one selected from at least one first file, at least one update to a second file, and at least one update instruction to the second file responsive to the receiving the request step;
removing a restriction on user communication with the remote network responsive to the receiving at least one step; and
forwarding communication between the user and the remote network.

7. The method of claim 6 comprising the additional steps of:
receiving a trusted network file comprising identifiers of at least one first additional network;
receiving a request to connect to at least one second additional network; and
connecting to the at least one second additional network responsive to the at least one second additional network comprising at least one of the at least one first additional network.

8. The method of claim 7 wherein the trusted network file is at least one selected from the first file and the second file.

9. The method of claim 6 comprising the additional steps of:
receiving from a first client application a request to access an area of storage;
locating at least one access permission for the client application; and
allowing access to the area of storage responsive to the access request received and the access permission located.

10. The method of claim 9 wherein the area of storage comprises a file.

11. The method of claim 9 wherein the area of storage comprises one selected from a directory or a subdirectory.

12. A computer program product comprising a computer useable medium having computer readable program code embodied therein for connecting to a remote network, the computer program product comprising:
computer readable program code devices configured to cause a computer to receive a request to connect to a remote network;
computer readable program code devices configured to cause a computer to establish a connection to the remote network;
computer readable program code devices configured to cause a computer to restrict user communication with the remote network responsive to the computer readable program code devices configured to cause a computer to receive the request;
computer readable program code devices configured to cause a computer to receive at least one selected from at least one first file, at least one update to a second file, and at least one update instruction to the second file responsive to the computer readable program code devices configured to cause a computer to receive the request;

computer readable program code devices configured to cause a computer to remove a restriction on user communication with the remote network responsive to the computer readable program code devices configured to cause computer to receive at least one; and computer readable program code devices configured to cause a computer to forward communication between the user and the remote network.

13. The computer program product of claim 12 additionally comprising:

computer readable program code devices to configure to cause a computer to receive a trusted network file comprising identifiers of at least one first additional network;

computer readable program code devices configured to cause a computer to receive a request to connect to at least one second additional network; and computer readable program code devices configured to cause a computer to connect to the at least one second additional network responsive to the at least one second additional network comprising at least one of the at least one first additional network.

14. The computer program product of claim 13 wherein the trusted network file is at least one selected from the first file and the second file.

15. The computer program product of claim 12 additionally comprising:

computer readable program code devices configured to cause a computer to receive from a first client application a request to access an area of storage;

computer readable program code devices configured to cause a computer to locate at least one access permission for the client application; and computer readable program code devices configured to cause a computer to allow access to the area of storage responsive to the access request received and the access permission located.

16. The computer program product of claim 15 wherein the area of storage comprises a file.

17. The computer program of claim 15 wherein the area of storage comprises one selected from a directory or a subdirectory.

* * * * *